(12) United States Patent
Saint-Marc et al.

(10) Patent No.: US 10,899,451 B2
(45) Date of Patent: Jan. 26, 2021

(54) AIRCRAFT COMPRISING A LUGGAGE STORAGE CONTAINER HOUSED IN THE LEADING EDGE CONCAVITY

(71) Applicant: AIRBUS OPERATIONS (S.A.S.), Toulouse (FR)

(72) Inventors: Laurent Saint-Marc, Montaigut sur Save (FR); Bernard Guering, Montrabe (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 354 days.

(21) Appl. No.: 15/986,068

(22) Filed: May 22, 2018

(65) Prior Publication Data
US 2018/0334254 A1  Nov. 22, 2018

(30) Foreign Application Priority Data
May 22, 2017 (FR) ...................... 17 54542

(51) Int. Cl.
| | |
|---|---|
| B64D 11/00 | (2006.01) |
| B64C 39/10 | (2006.01) |
| B64C 1/00 | (2006.01) |
| B64C 23/00 | (2006.01) |

(52) U.S. Cl.
CPC .......... *B64D 11/003* (2013.01); *B64C 23/005* (2013.01); *B64C 2001/0045* (2013.01); *B64C 2039/105* (2013.01)

(58) Field of Classification Search
CPC . B64D 11/003; B64D 11/00; B64C 2039/105; B64C 39/10; B64C 2001/0045; B64C 1/06
See application file for complete search history.

(56) References Cited

U.S. PATENT DOCUMENTS

| | | | | |
|---|---|---|---|---|
| 2,650,780 A | * | 9/1953 | Northrop | B64C 39/10 244/13 |
| 3,405,893 A | * | 10/1968 | Rajau | B64C 1/00 244/119 |
| 5,149,012 A | | 9/1992 | Valverde | |
| 5,813,628 A | * | 9/1998 | Hahl | B64C 1/0009 244/218 |
| 5,893,535 A | * | 4/1999 | Hawley | B64C 3/00 244/119 |
| 5,897,078 A | * | 4/1999 | Burnham | B64C 1/0009 244/117 R |
| 6,578,798 B1 | | 6/2003 | Dizdarevic et al. | |
| 6,923,403 B1 | * | 8/2005 | Dizdarevic | B64C 1/0009 244/117 R |

(Continued)

OTHER PUBLICATIONS

Search Report and Opinion for FR1754542 dated Jan. 12, 2018, 6 pages.

*Primary Examiner* — Richard R. Green
*Assistant Examiner* — William L Gmoser
(74) *Attorney, Agent, or Firm* — Nixon &. Vanderhye P.C.

(57) ABSTRACT

An aircraft is disclosed having a lifting body housing a passenger cabin including a forward portion bounded laterally by at least one portion of a leading edge of the lifting body. The passenger cabin includes at least one lateral luggage storage device housed in the concavity formed by the leading edge portion and includes an opening towards the interior of the passenger cabin.

15 Claims, 5 Drawing Sheets

(56) References Cited

U.S. PATENT DOCUMENTS

| | | | | |
|---|---|---|---|---|
| 8,398,022 B2* | 3/2013 | Cazals | ................... | B64D 27/20 244/119 |
| 2004/0217234 A1* | 11/2004 | Jones | ................. | B64D 11/0015 244/118.5 |
| 2011/0121130 A1* | 5/2011 | Odle | ....................... | B64C 39/10 244/36 |
| 2014/0175215 A1* | 6/2014 | Gallant | ................... | B64C 39/10 244/36 |
| 2017/0283059 A1* | 10/2017 | McKee | .............. | B64D 11/0007 |

* cited by examiner

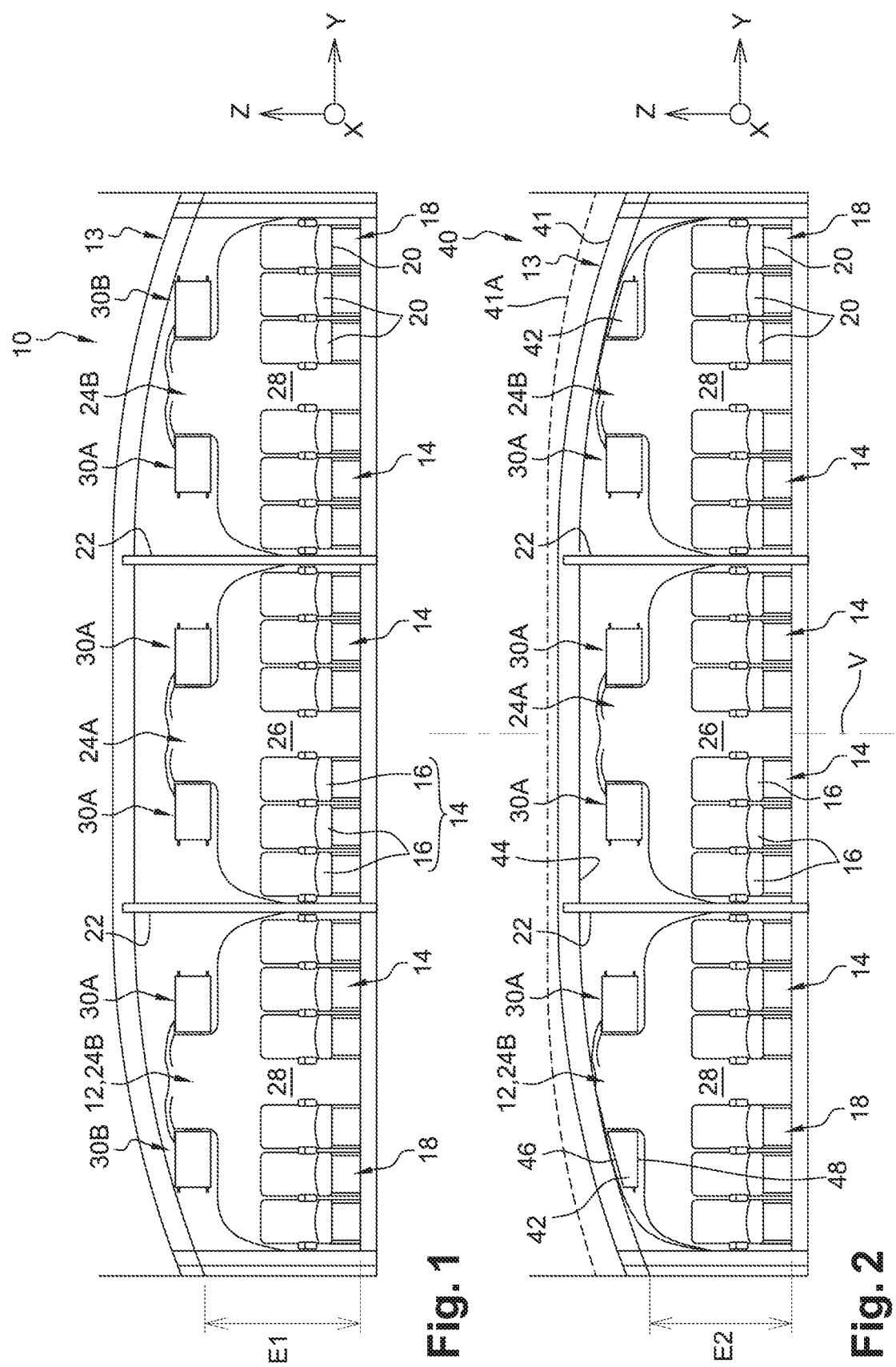

AIRCRAFT COMPRISING A LUGGAGE STORAGE CONTAINER HOUSED IN THE LEADING EDGE CONCAVITY

CROSS RELATED APPLICATION

This application claims priority to and incorporates by reference French Patent Application Number 1754542 filed, May 22, 2017.

TECHNICAL FIELD

The present invention relates to an aircraft of the type comprising a lifting body housing a passenger cabin comprising a forward portion bounded laterally by at least one portion of a leading edge of the lifting body. Such an aircraft may, depending on its shape, be qualified as flying wing or blended wing body (BWB).

BACKGROUND

Research conducted in order to optimize the performance of this type of aircraft aims to reduce the front section of these aircraft so as to reduce their drag.

However, reducing the height of the passenger cabin area for a flying wing or blended wing body aircraft may result in reduction in size of the overhead luggage storage area within the aircraft cabin.

SUMMARY

The present disclosure is embodied as an aircraft of the type described above, in which the passenger cabin comprises at least one lateral luggage storage device housed in the concavity formed by the leading edge portion bounding the forward part of the passenger cabin, and having an opening towards the interior of the passenger cabin.

The invention requires modifying the internal layout of the passenger cabin and the arrangement of the luggage storage area, in order to make it possible to reduce the thickness (that is to say, the vertical extent), and hence the front section, of the aircraft.

In fact, the applicant has found that a critical parameter determining the thickness of an aircraft of this type in the prior art resided in the use of upper luggage storage devices, arranged above the seats as is done in conventional aircraft with a fuselage, including with regard to the seats situated on the sides of the aircraft.

In an exemplary embodiment, the luggage may be housed in a lateral luggage storage device housed in the concavity formed by the leading edge portion.

The invention therefore makes it possible to eliminate or reduce at least some of the upper luggage storage devices arranged above the seats in the flying wing or blended wing body aircraft seats situated on the sides of the aircraft.

The lateral luggage storage device may include several superimposed rows of compartments or racks for luggage.

The lateral luggage storage device may be disposed forward of passenger seats, separated from them by a lateral aisle.

The portion of the leading edge may include an access door providing access within the lateral luggage storage compartment from the lateral aisle.

The portion of the leading edge may include frames for stiffening an outer skin of the aircraft, the frames being in the shape of arches with concavity, wherein the concavity is turned towards the interior of the passenger cabin.

Each frame may include a respective upper end and a respective lower end, and the upper and lower ends of at least some of the frames may be connected to each other by respective pillars, which define between them sections for access to the lateral luggage storage device from the passenger cabin.

Two consecutive pillars may be connected to each other by an upper crosspiece that bounds the corresponding access section and to which are coupled the respective upper ends of two frames that are respectively connected to the two consecutive pillars.

Another frame may be inserted between the two frames that are respectively connected to the two consecutive pillars preferably also has an upper end coupled to the upper crosspiece.

The passenger cabin preferably may include at least one inner longitudinal row of passenger seats provided with an upper luggage storage device disposed above the inner longitudinal row, and at least one lateral longitudinal row of passenger seats without a luggage storage device disposed above the lateral longitudinal row or provided with a secondary luggage storage device disposed above the lateral longitudinal row and having a height less than a height of the upper luggage storage device.

The passenger cabin may include a rear portion adjacent to the forward portion and bounded laterally by pressure bulkheads separating the passenger cabin from lateral unpressurized spaces of the aircraft.

BRIEF DESCRIPTION OF THE DRAWINGS

The invention will be better understood, and other details, advantages and characteristics thereof will emerge on reading the following description given as a non-limitative example and with reference to the attached drawings, in which:

FIG. 1 is a diagrammatic partial cross-sectional view of an aircraft of known type;

FIG. 2 is a view similar to FIG. 1, illustrating an aircraft according to an exemplary embodiment of the invention;

In all of these figures, identical references may designate identical or similar elements.

DETAILED DESCRIPTION OF EMBODIMENTS

Figure 3:
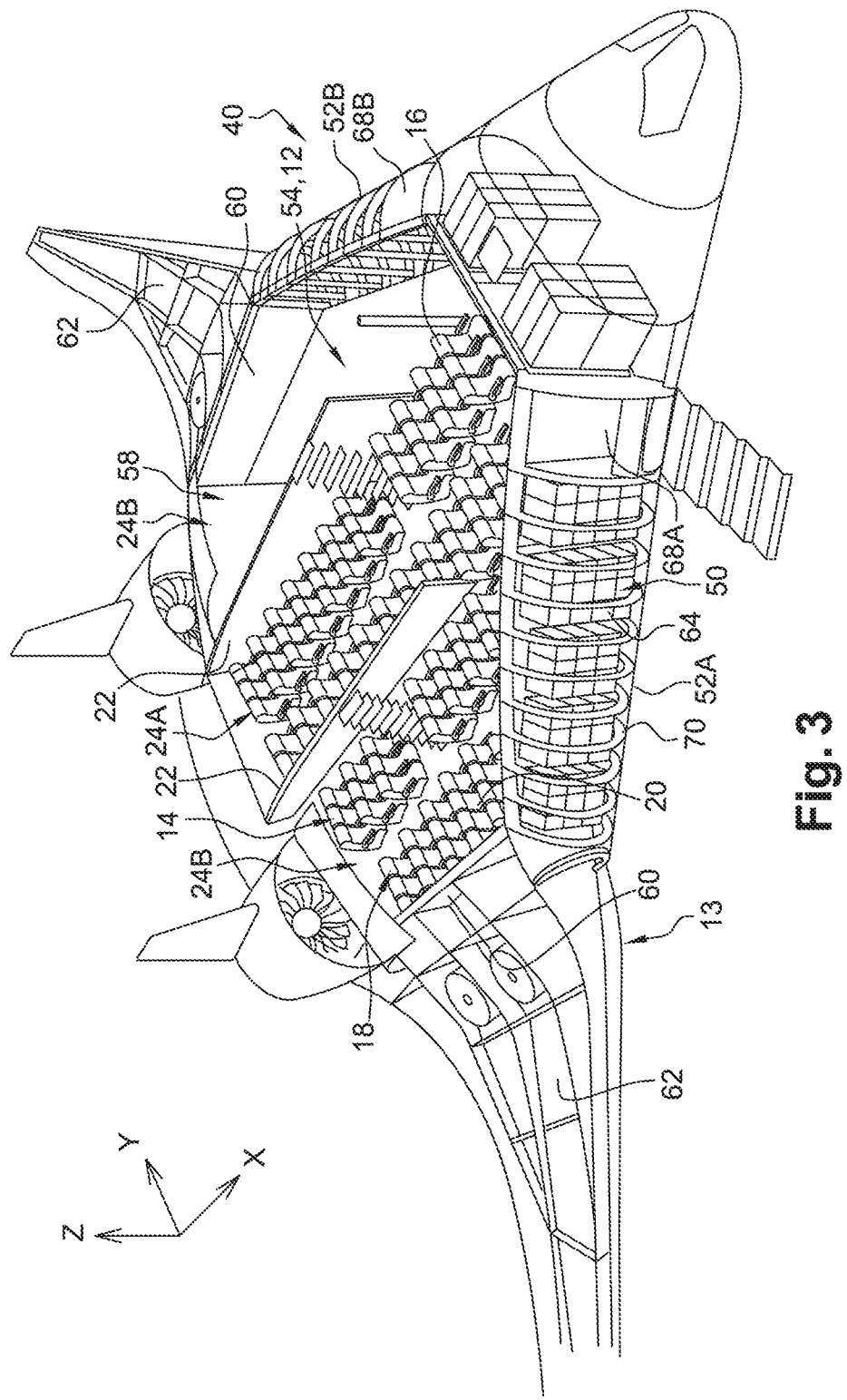
FIGS. 3 and 4 are partial diagrammatic perspective views in of the aircraft of FIG. 2.

FIG. 1 partially illustrates an aircraft 10 having passenger cabin 12 housed in a lifting body 13. The aircraft 10 comprises a forward portion bounded laterally by at least one portion of a leading edge of the lifting body, as will appear more clearly in what is to follow. In the illustrated example, the aircraft 10 is a flying wing.

In the present disclosure, X is the longitudinal direction of the aircraft corresponding to its flying direction, Z is the vertical direction of the aircraft, corresponding to the direction of the height perceived by a passenger on board the aircraft, and Y is the transversal direction orthogonal to the longitudinal direction X and the vertical direction Z.

The passenger cabin 12 includes a group of passenger seats distributed in several longitudinal rows grouped in blocks of passenger seats, for example four inner blocks 14 each comprising three longitudinal inner rows 16, and two lateral blocks 18 each comprising three longitudinal lateral rows 20.

The passenger cabin 12 may include three longitudinal seating sections separated from each other by bulkheads 22 resulting in a central longitudinal section 24A and two lateral longitudinal sections 24B.

The central longitudinal section 24A includes two of the four inner blocks 14, separated from each other by a first longitudinal aisle 26. Each lateral longitudinal section 24B includes one of the other two inner blocks 14 and one of the lateral blocks 18, separated from each other by a respective second longitudinal aisle 28.

The lateral longitudinal row of passenger seats forms a lateral end of the group of passenger seats or is arranged in a block which forms a lateral end of the group of passenger seats. The inner longitudinal row of passenger seats is arranged between lateral longitudinal rows within the group of passenger seats, hence in a median region of this group.

As shown in FIG. 1, each block 14, 18 of passenger seats is surmounted by an upper luggage storage device 30A, 30B, taking the form of a longitudinal row of storage compartments of the type commonly used in conventional aircraft with a fuselage, and making it possible to house the luggage of the passengers seated below. The upper luggage storage devices 30A that surmount each of the inner blocks 14 and those 30B that surmount each of the lateral blocks 18 may be similar.

The upper luggage storage devices 30B that surmount each of the lateral blocks 18 determine a minimum below which it is not possible to reduce the thickness E1 (that is to say, the extent along the vertical direction Z) of the passenger cabin at the lateral ends thereof. The arrangement of the upper luggage storage devices 30B therefore opposes the reduction of the front section of the aircraft and thus limits the performance thereof.

FIG. 2 illustrates an aircraft 40 in accordance with an exemplary embodiment which is fitted with a new configuration of luggage storage devices making it possible to reduce the thickness E2 of the passenger cabin at the lateral ends thereof, as illustrated by the lowering of the upper portion 41 of the outer skin of the aircraft relative to the position of the upper portion of the outer skin of the aircraft of FIG. 1, which appears as a dotted line 41A on FIG. 2.

The inner blocks 14 include overhead upper luggage storage devices 30A for housing the luggage of the passengers occupying the seats of these inner blocks 14, while the lateral blocks 18 are surmounted by secondary luggage storage devices 42, which are, in a general manner, considerably narrower along the vertical direction Z than the upper luggage storage devices 30A. These secondary luggage storage devices 42 may be configured to conform to the curve of the ceiling 44 of the passenger cabin 12. Each of the secondary luggage storage devices 42 may include an upper end wall 46 inclined relative to a horizontal plane XY and a lower end wall 48 parallel to the horizontal plane XY.

One of the advantages of the secondary luggage storage devices 42 is to house a few personal possessions of the passengers occupying the seats of the lateral blocks 18, but these secondary luggage storage devices 42 are not dimensioned to house all of the luggage of these passengers.

Referring now to FIGS. 3-6, the passenger cabin 12 comprises at least one lateral luggage storage device 50 housed in the concavity formed by a portion 52A of the leading edge bounding laterally the forward portion 54 of the passenger cabin. The concavity is a volume within the leading edge between the skin of the leading edge and passenger cabin area. The lateral luggage storage device 50 may include an opening 56 (FIG. 5) on the side of the interior of the passenger cabin.

Figure 4:
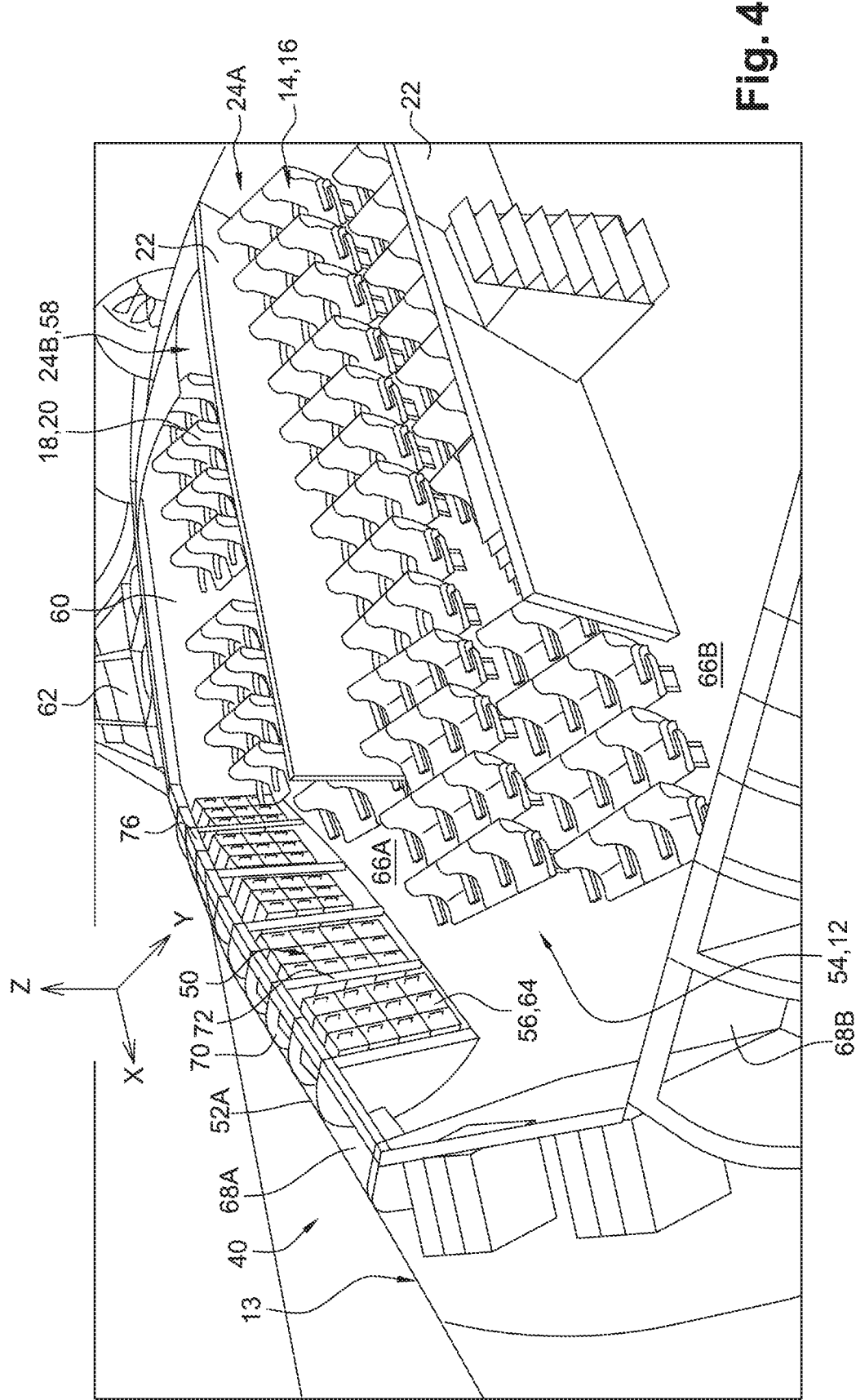

It should be noted that the passenger cabin 12 is globally symmetrical relative to a median vertical plane V (FIGS. 2 and 6), although on FIGS. 3 and 4, the seats and other interior arrangements of one of the lateral longitudinal sections 24B of the cabin are not shown for the sake of simplification. Neither are the upper luggage storage devices 30A and the secondary luggage storage devices 42 shown on FIGS. 3-6 for reasons of clarity.

The passenger cabin 12 of the aircraft illustrated in FIGS. 3-6 may include a forward portion 54 bounded laterally by portions 52A, 52B of the leading edge, and a rear portion 58 bounded laterally by pressure bulkheads 60 separating the passenger cabin 12 from lateral unpressurized spaces 62 of the aircraft. Each of the longitudinal rows of seats 16 and 20 extends, for example, both into the rear portion 58 and into the forward portion 54.

In an exemplary embodiment, each of the portions 52A and 52B of the leading edge bounding laterally the forward portion 54 of the passenger cabin integrates several lateral luggage storage devices 50. For example, each portion 52A, 52B may include five luggage storage devices shown only in portion 52 of FIG. 3.

Figure 5:
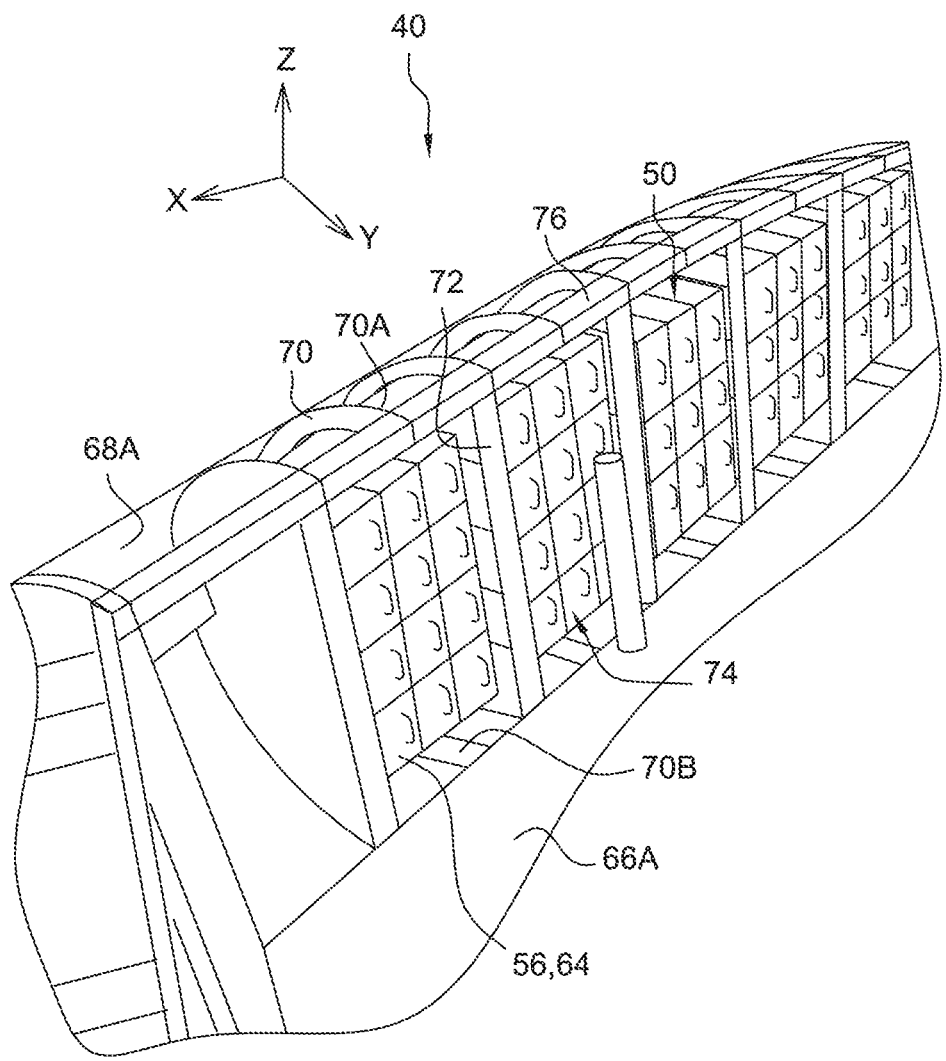
FIG. 5 is a partial diagrammatic perspective larger scale view of a portion of FIG. 4; and, FIG. 6 is a diagrammatic partial top view of the aircraft of FIG. 2.

Referring to FIG. 5, each lateral luggage storage device 50 may include several superimposed rows of compartments 64, or alternatively, luggage racks or cells. In an exemplary embodiment, each device may include four superimposed rows each including three compartments. The opening 56 of each lateral luggage storage device 50 in this case takes the form of a plurality of respective doors of the compartments 64.

Figure 6:
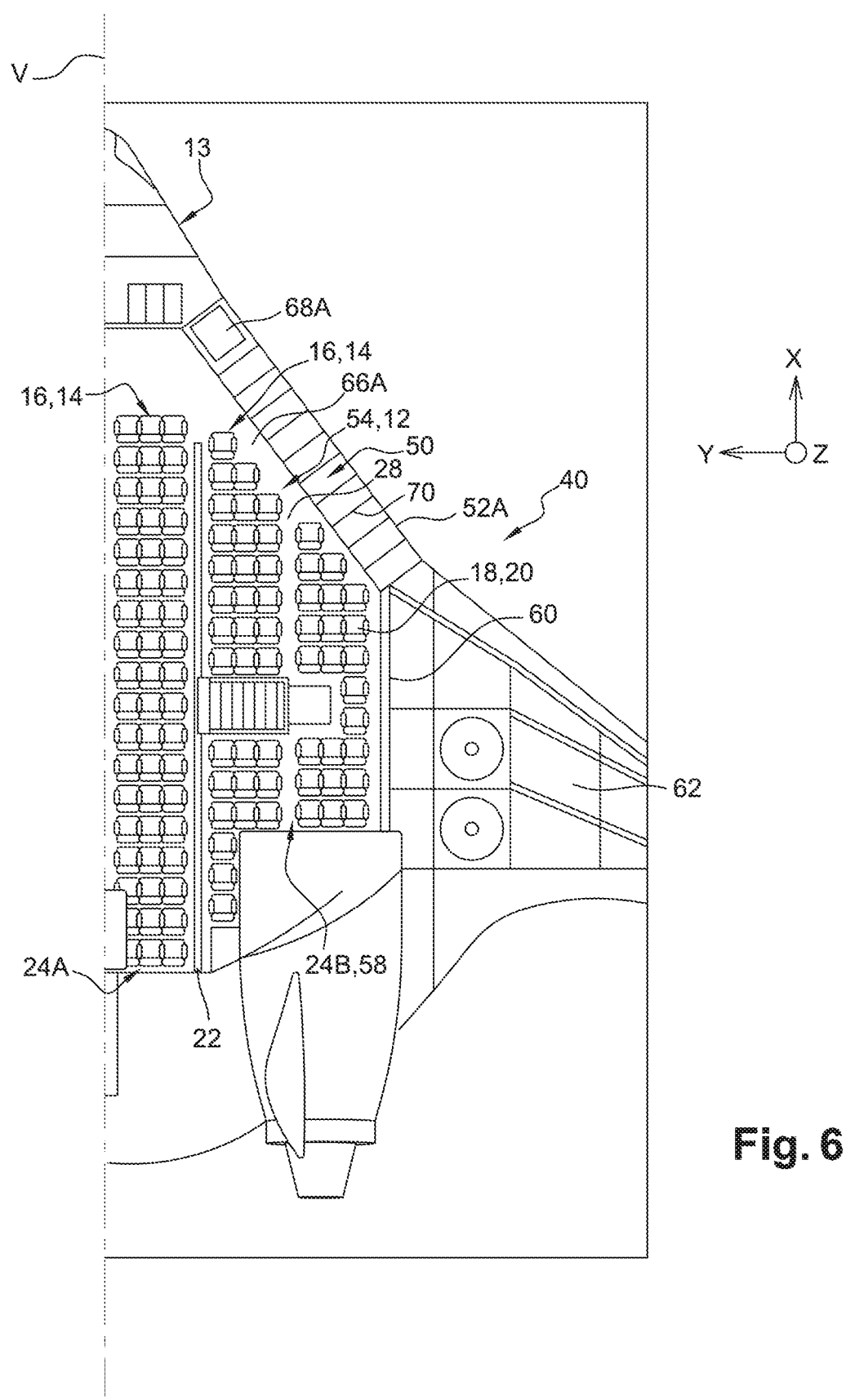

Furthermore, as seen in FIGS. 4-6, each lateral luggage storage device 50 may be disposed forward of passenger seats, separated from them by a lateral aisle 66A, 66B. In this case, these are seats belonging to the lateral block 18 or to the inner block 14 of either one of the two lateral longitudinal sections 24B (FIGS. 3 and 6).

Each portion 52A, 52B of the leading edge may include a respective access door 68A, 68B providing access from the corresponding lateral aisle 66A, 66B, and disposed next to one of the lateral luggage storage devices 50 along the direction of the leading edge.

Each portion 52A, 52B of the leading edge may include arch-shaped frames 70 each forming a concavity, the concavity being turned towards the interior of the passenger cabin, and the frames 70 may be fastened to the outer skin of the aircraft.

Each frame 70 has a respective upper end 70A and a respective lower end 70B.

The upper and lower ends 70A, 70B of at least some of the frames, for example one frame out of two, are connected to each other by respective pillars 72, which define between them sections 74 for access to one of the lateral luggage storage devices 50 from the passenger cabin. The pillars 72 extend substantially along the vertical direction Z.

Furthermore, the structure of each of the portions 52A, 52B of the leading edge is terminated, at its upper end, by an upper crosspiece 76 to which the respective upper ends 70A of the frames 70 and the pillars 72 are connected.

Thus, in the illustrated example, two consecutive pillars 72 are connected to each other by the upper crosspiece 76 to which are coupled to the respective upper ends 70A of two frames 70 that are respectively connected to the two consecutive pillars 72. Furthermore, another frame 70 inserted between the two frames that are respectively connected to the two consecutive pillars 72 also has an upper end 70A coupled to the upper crosspiece 76.

The lateral luggage storage devices 50 can be used entirely for transporting luggage of passengers occupying the seats of the lateral blocks 18. Alternatively, when the capacity of these devices 50 exceeds the needs corresponding to the seats of the lateral blocks 18, some of the devices 50 can be reserved for transporting merchandise.

Moreover, the arrangement of lateral luggage storage devices 50 in the concavity formed by the portions 52A, 52B of the leading edge makes it possible to slim down the front section of the aircraft 40.

Even though, in the illustrated preferred example, the lateral blocks 18 are surmounted by secondary luggage storage devices 42, the aircraft may of course be without luggage storage devices surmounting the lateral blocks 18 without departing from the scope of the present invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft, comprising:
 a lifting body having a leading edge and housing a passenger cabin;
 the passenger cabin including a forward portion bounded laterally by at least one portion of the leading edge of the lifting body;
 wherein the passenger cabin comprises at least one lateral luggage storage device housed in a concavity formed by the at least one portion of the leading edge;
 wherein the at least one portion of the leading edge includes a frame for stiffening the outer skin of the aircraft and defining the at least one lateral luggage storage device; and,
 wherein the at least one lateral luggage storage device includes several superimposed rows of compartments or racks for luggage, and further includes an opening facing the interior of the passenger cabin.

2. The aircraft as claimed in claim 1, wherein the lateral luggage storage device is disposed forward of passenger seats and separated therefrom by a lateral aisle.

3. The aircraft as claimed in claim 2, wherein the portion of the leading edge includes an access door providing access from the lateral aisle.

4. The aircraft as claimed in claim 1, wherein the frames are in the shape of arches with concavity turned towards the interior of the passenger cabin.

5. The aircraft as claimed in claim 4, wherein each frame has a respective upper end and a respective lower end, and wherein the upper and lower ends of at least one of the frames are connected to each other by respective pillars, which define between them sections for access to the lateral luggage storage device from the passenger cabin.

6. The aircraft as claimed in claim 5, wherein two consecutive pillars are connected to each other by an upper crosspiece that bounds the corresponding access section and to which are coupled the respective upper ends of two frames that are respectively connected to the two consecutive pillars.

7. The aircraft as claimed in claim 6, wherein another frame inserted between the two frames that are respectively connected to the two consecutive pillars also has an upper end coupled to the upper crosspiece.

8. The aircraft as claimed in claim 7, the passenger cabin includes at least one inner longitudinal row of passenger seats provided with an upper luggage storage device disposed above the inner longitudinal row, and at least one lateral longitudinal row of passenger seats without a luggage storage device disposed above the lateral longitudinal row or provided with a secondary luggage storage device disposed above the lateral longitudinal row and having a height less than a height of the upper luggage storage device.

9. The aircraft as claimed in claim 8, wherein the passenger cabin further comprises a rear portion adjacent to the forward portion and bounded laterally by pressure bulkheads separating the passenger cabin from lateral unpressurized spaces of the aircraft.

10. An aircraft, comprising:
 a lifting body having a leading edge, wherein the leading edge is concave and defines a concavity volume within the leading edge;
 a passenger cabin area disposed within the lifting body and behind at least a portion of the leading edge;
 a luggage storage compartment in the concavity of the leading edge and open to the passenger cabin area including several superimposed rows of compartments or racks for luggage; and,
 at least one upper beam connecting two adjoining frames, and at least one pillar extending from the at least one upper beam to a cabin floor.

11. The aircraft of claim 10, further comprising an access door providing access to the luggage storage compartment from the passenger cabin area.

12. The aircraft of claim 11, wherein the portion of the leading edge further includes a plurality of arch-shaped frames attached to an outer skin of the aircraft.

13. The aircraft of claim 10, wherein the luggage storage compartment extends from the cabin floor to an upper portion of the lifting body.

14. The aircraft of claim 13, wherein the luggage storage compartment longitudinally extends along a portion of the leading edges.

15. The aircraft of claim 10, further comprising an aisle disposed between the luggage storage compartment and the passenger seats.

* * * * *